(12) United States Patent
Ma et al.

(10) Patent No.: US 9,560,527 B2
(45) Date of Patent: Jan. 31, 2017

(54) VERSION PROTECTION METHOD AND APPARATUS FOR MOBILE TERMINAL

(71) Applicant: ZTE Corporation, Shenzhen, Guangdong (CN)

(72) Inventors: Lan Ma, Shenzhen (CN); Cuihong Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/439,904

(22) PCT Filed: Jul. 23, 2013

(86) PCT No.: PCT/CN2013/079874
§ 371 (c)(1),
(2) Date: Jun. 2, 2015

(87) PCT Pub. No.: WO2013/167071
PCT Pub. Date: Nov. 14, 2013

(65) Prior Publication Data
US 2015/0341485 A1    Nov. 26, 2015

(30) Foreign Application Priority Data
Nov. 7, 2012    (CN) .......................... 2012 1 0441077

(51) Int. Cl.
*H04W 12/12* (2009.01)
*H04W 12/04* (2009.01)
(Continued)

(52) U.S. Cl.
CPC ............... *H04W 12/12* (2013.01); *H04M 1/66* (2013.01); *H04M 1/72577* (2013.01); *H04W 12/04* (2013.01); *H04M 1/72525* (2013.01)

(58) Field of Classification Search
CPC    H04M 1/66; H04M 1/72525; H04M 1/72577; H04M 1/725; H04W 12/04; H04W 12/12
(Continued)

(56) References Cited

U.S. PATENT DOCUMENTS 6,108,785 A *    8/2000    Poisner .................. G06F 21/34
                                                                  726/20
7,178,167 B1 *   2/2007    Katoh ..................... G06F 21/31
                                                                  726/16
(Continued)

FOREIGN PATENT DOCUMENTS

CN          101198119 A      6/2008
CN          102104679 A      6/2011
(Continued)

OTHER PUBLICATIONS

International Search Report in international application No. PCT/CN2013/079874, mailed on Oct. 10, 2013.
(Continued)

*Primary Examiner* — Nathan Taylor
(74) *Attorney, Agent, or Firm* — Oppedahl Patent Law Firm LLC

(57) ABSTRACT

Provided is a version protection method for a mobile terminal, which includes: monitoring a local event of the mobile terminal and judging whether the mobile phone enters a loss protection state or not; and after the mobile phone is determined to enter the loss protection state, recording a loss state event, switching a current working state to the loss protection state, and limiting a corresponding function. A version protection apparatus for a mobile terminal is also provided. Accordingly, a beneficial effect of performing specific version protection on the mobile terminal entering the protection state is achieved, reliability of the mobile terminal is improved, and a user experience is improved by monitoring the local event of the mobile
(Continued)

terminal, recording the loss state event after the mobile terminal is determined to enter the loss protection state, switching the current working state to the loss protection state and limiting the corresponding function.

8 Claims, 4 Drawing Sheets

(51) Int. Cl.
*H04M 1/66* (2006.01)
*H04M 1/725* (2006.01)

(58) Field of Classification Search
USPC .......................................................... 455/411
See application file for complete search history.

(56) References Cited

U.S. PATENT DOCUMENTS

| | | | |
|---|---|---|---|
| 7,266,849 B1* | 9/2007 | Gregory | G06F 21/575 |
| | | | 713/193 |
| 2003/0097596 A1* | 5/2003 | Muratov | G06F 21/31 |
| | | | 726/26 |
| 2003/0126462 A1* | 7/2003 | Howard | H04W 12/12 |
| | | | 726/4 |
| 2005/0022178 A1* | 1/2005 | Ghafoor | G06F 8/65 |
| | | | 717/171 |
| 2007/0138999 A1* | 6/2007 | Lee | H02J 7/00 |
| | | | 320/107 |
| 2009/0249497 A1* | 10/2009 | Fitzgerald | H04W 12/12 |
| | | | 726/35 |
| 2009/0253408 A1* | 10/2009 | Fitzgerald | G06F 21/316 |
| | | | 455/411 |
| 2010/0162374 A1* | 6/2010 | Nair | H04L 12/00 |
| | | | 726/7 |
| 2011/0141276 A1* | 6/2011 | Borghei | H04W 12/08 |
| | | | 348/143 |
| 2014/0004825 A1* | 1/2014 | Prakash | H04W 12/06 |
| | | | 455/411 |

FOREIGN PATENT DOCUMENTS

| | | |
|---|---|---|
| CN | 102378155 A | 3/2012 |
| CN | 102946604 A | 2/2013 |
| JP | 2001273135 A | 10/2001 |
| JP | 2004297156 A | 10/2004 |
| JP | 2005167463 A | 6/2005 |
| JP | 2006303817 A | 11/2006 |
| JP | 2008092351 A | 4/2008 |
| JP | 2008227692 A | 9/2008 |
| JP | 2010111727 A | 5/2010 |
| KR | 20060002603 A | 1/2006 |
| KR | 1020060031740 A | 4/2006 |
| KR | 1020070043163 A | 4/2007 |

OTHER PUBLICATIONS

English Translation of the Written Opinion of the International Search Authority in international application No. PCT/CN2013/079874, mailed on Oct. 10, 2013.
Supplementary European Search Report in European application No. 13787783.3, mailed on Nov. 9, 2015.

* cited by examiner

VERSION PROTECTION METHOD AND APPARATUS FOR MOBILE TERMINAL

TECHNICAL FIELD

The present disclosure relates to the technical field of mobile terminals, and in particular to a version protection method and apparatus for a mobile terminal.

BACKGROUND

Functions of a mobile phone get increasingly powerful, a user also gets more and more dependent on a mobile phone. A lot of important information of a user is stored in a mobile phone, and for the user, once the mobile phone is lost, not only is pecuniary loss caused, but also lots of important personal information may be lost. On such a basis, a technology of protection is proposed for the situation when a mobile phone is lost, that is, after the mobile phone is lost, the mobile phone can be remotely or locally triggered to enter an after-loss protection state, and the protection state is mostly based on a limit to the authority over the use of a mobile phone version, and the probability that the mobile phone is used by others after being lost is reduced by limiting available functions or locking the mobile phone.

In an existing technology, the problem that it is difficult for an owner to take his/her mobile phone back after losing the mobile phone is solved by forced-push communication in a relocation manner, so that a person holding the mobile phone actively establishes a communication channel with the owner; and meanwhile, after a forced-push communication mode is triggered, the available functions of the mobile phone are limited to a certain extent.

However, the existing technology has great defects, which is caused by the fact that there is a widely existing problem that a protection function can be removed along with version updating because the mobile phone is protected by protecting a software version or application of the mobile phone in the existing technology, that is, for a mobile phone which has been lost and entered a protection state, the mobile phone cannot be protected once the person holding the mobile phone performs recovery, but can still be used as a mobile phone with normal functions after recovered; therefore, an existing terminal protection technology does not play any role in protecting a lost mobile phone subjected to software version updating.

SUMMARY

The embodiment of the present disclosure provide a version protection method and apparatus for a mobile terminal, so as to solve the problem that a loss protection function of a mobile phone can be bypassed by version updating.

An embodiment of the present disclosure provides a version protection method for a mobile terminal, which includes:

monitoring a local event of the mobile terminal, and judging whether the mobile phone enters a loss protection state or not; and after the mobile phone is determined to enter the loss protection state, recording a loss state event, switching a current working state to the loss protection state, and limiting a corresponding function.

Preferably, after recording the loss state event, switching the current working state to the loss protection state and limiting the corresponding function, the method may further include:

when a user performs software downloading or updating on the mobile terminal, verifying identity of the user; if the user passes verification, then allowing the software downloading or updating; if the user does not pass verification, then forbidding the software downloading or updating.

Preferably, before monitoring the local event of the mobile terminal and judging whether the mobile phone enters the loss protection state or not, the method may further include:

enabling a loss protection function, and setting an identity verification key.

Preferably, the step of verifying the identity of the user may include:

comparing identity verification information input by the user with the stored identity verification key;

if the identity verification information input by the user is consistent with the stored identity verification key, then determining that the user passes the verification;

if the identity verification information input by the user is inconsistent with the stored identity verification key, then determining that the user does not pass the verification.

Preferably, the step of monitoring the local event of the mobile terminal, and judging whether the mobile phone enters the loss protection state or not may include:

when the local event of the mobile terminal is monitored, controlling the mobile phone to enter the loss protection state if there is triggering of the loss state event; if a remote control instruction is received, then performing identity authentication on the remote control instruction; if the remote control instruction passes the identity authentication, then controlling the mobile phone to enter the loss protection state; if the remote control instruction does not pass the identity authentication, then continuing monitoring the remote control instruction.

Preferably, after monitoring the local event of the mobile terminal and judging whether the mobile phone enters the loss protection state or not, the method may further include:

after the mobile phone is determined not to enter the loss protection state, keeping the current working state, and when the user performs software downloading or updating on the mobile terminal, allowing the software downloading or updating.

Another embodiment of the present disclosure further provides a version protection apparatus for a mobile terminal, which includes:

an event monitoring module, configured to monitor a local event of the mobile terminal, and judge whether the mobile phone enters a loss protection state or not; and a loss protection module, configured to, after the mobile phone is determined to enter the loss protection state, record a loss state event, switch a current working state to the loss protection state, and limit a corresponding function.

Preferably, the version protection apparatus for the mobile terminal may further include:

a recovery protection module, configured to, when the mobile terminal enters the loss protection state and a user performs software downloading or updating on the mobile terminal, verify identity of the user, and then allow the software downloading or updating if the user passes verification, otherwise forbid the software downloading or updating if the user does not pass verification.

Preferably, the version protection apparatus for the mobile terminal may further include:

a function setting module, configured to enable a loss protection function, and set an identity verification key.

Preferably, recovery protection module may be configured to:

compare identity verification information input by the user with the stored identity verification key, then determine that the user passes the verification if the identity verification information input by the user is consistent with the stored identity verification key, otherwise, determine that the user does not pass the verification if the identity verification information input by the user is inconsistent with the stored identity verification key.

Preferably, the event monitoring module may include:

an event triggering unit, configured to, when the local event of the mobile terminal is monitored, control the mobile phone to enter the loss protection state if there is triggering of the loss state event; and/or an instruction control unit, configured to, when the local event of the mobile terminal is monitored, if a remote control instruction is received, then perform identity authentication on the remote control instruction, and control the mobile phone to enter the loss protection state if the remote control instruction passes the identity authentication, otherwise, continue monitoring the remote control instruction if the remote control instruction does not pass the identity authentication.

According to the embodiments of the present disclosure, the local event of the mobile terminal is monitored, the loss state event is recorded after the mobile terminal is determined to enter the loss protection state, the current working state is switched to the loss protection state and the corresponding function is limited, thereby obtaining a beneficial effect that specific version protection can be provided for the mobile terminal entering the protection state, improving reliability of the mobile terminal, and enhancing the user experience.

The implementation of the purpose, function characteristics and advantages of the embodiments of the present disclosure are further described with reference to the embodiments and the drawings.

DETAILED DESCRIPTION

The technical solutions of the present disclosure are further described below with reference to the drawings and specific embodiments. It should be understood that the specific embodiments described here are only adopted to explain the present disclosure but not intended to limit the present disclosure.

Figure 1:
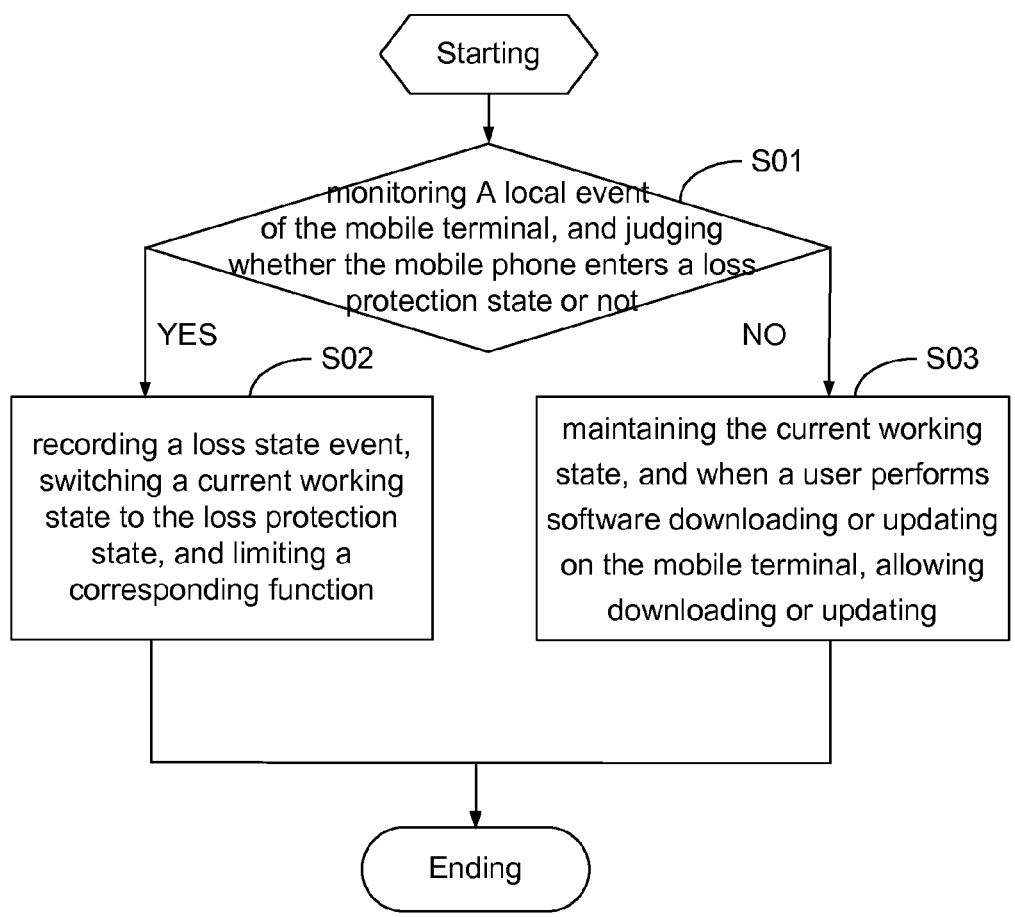
FIG. 1 is a flowchart of an embodiment of a version protection method for a mobile terminal according to the present disclosure.

FIG. 1 is a flowchart of an embodiment of a version protection method for a mobile terminal according to the present disclosure; and as shown in FIG. 1, the version protection method for the mobile terminal according to the embodiment of the present disclosure includes the following steps S01-S03.

Step S01 includes that a local event of the mobile terminal is monitored, and whether the mobile phone enters a loss protection state or not is judged; Step S02 is executed if the mobile phone enters a loss protection state, otherwise Step S03 is executed.

Here, a corresponding module in the mobile terminal monitors the local event of the mobile terminal, and judges whether the mobile terminal needs to enter the loss protection state or not according to a specific monitoring condition.

In a preferred embodiment, judgment criterions for judging whether the mobile terminal needs to enter the loss protection state or not mainly include two conditions: one is that a state of the mobile terminal is monitored according to a specific loss rule, and the mobile terminal is determined to enter the loss protection state after the mobile terminal satisfies a defined locking rule or a loss triggering condition, for example, a Subscriber Identity Module (SIM) card is replaced unlawfully; the other is that a remote control instruction is monitored, the remote control instruction is subjected to identity authentication after the remote control instruction is received, and whether the mobile terminal needs to enter the loss protection state or not is judged according to an identity authentication result, specifically, the mobile terminal is determined to enter the loss protection state if the remote control instruction passes the identity authentication, otherwise the monitoring of the remote control instruction is continued if the remote control instruction does not pass the identity authentication.

Step S02: a loss state event is recorded, a current working state is switched to the loss protection state, and a corresponding function is limited.

Here, when the mobile terminal is determined to enter the loss protection state in Step S01, the mobile terminal records and stores the loss state event which triggers the mobile terminal itself to enter the loss protection state; and meanwhile, the current working state is switched to the loss protection state, a system is forced to be restarted; and in a forced restarting process of the system, some functions and available resources of the mobile terminal are limited according to certain protection rules.

Step S03: the current working state is maintained, and when a user performs software downloading or updating on the mobile terminal, the downloading or updating is allowed.

Here, when the mobile terminal is determined not to enter the loss protection state in Step S01, and the mobile terminal is still in a normal working state, the mobile terminal is maintained in the current normal working state, and all legal operation of the user is allowed, for example, the user is allowed to download software or update programs.

The embodiment obtains a beneficial effect that a specific version protection can be provided for the mobile terminal which has entered the protection state, improves the reliability of the mobile terminal, and enhances the user experience by monitoring the local event of the mobile terminal, recording the loss state event after the mobile terminal is determined to enter the loss protection state, switching the current working state to the loss protection state and limiting the corresponding function.

Figure 2:
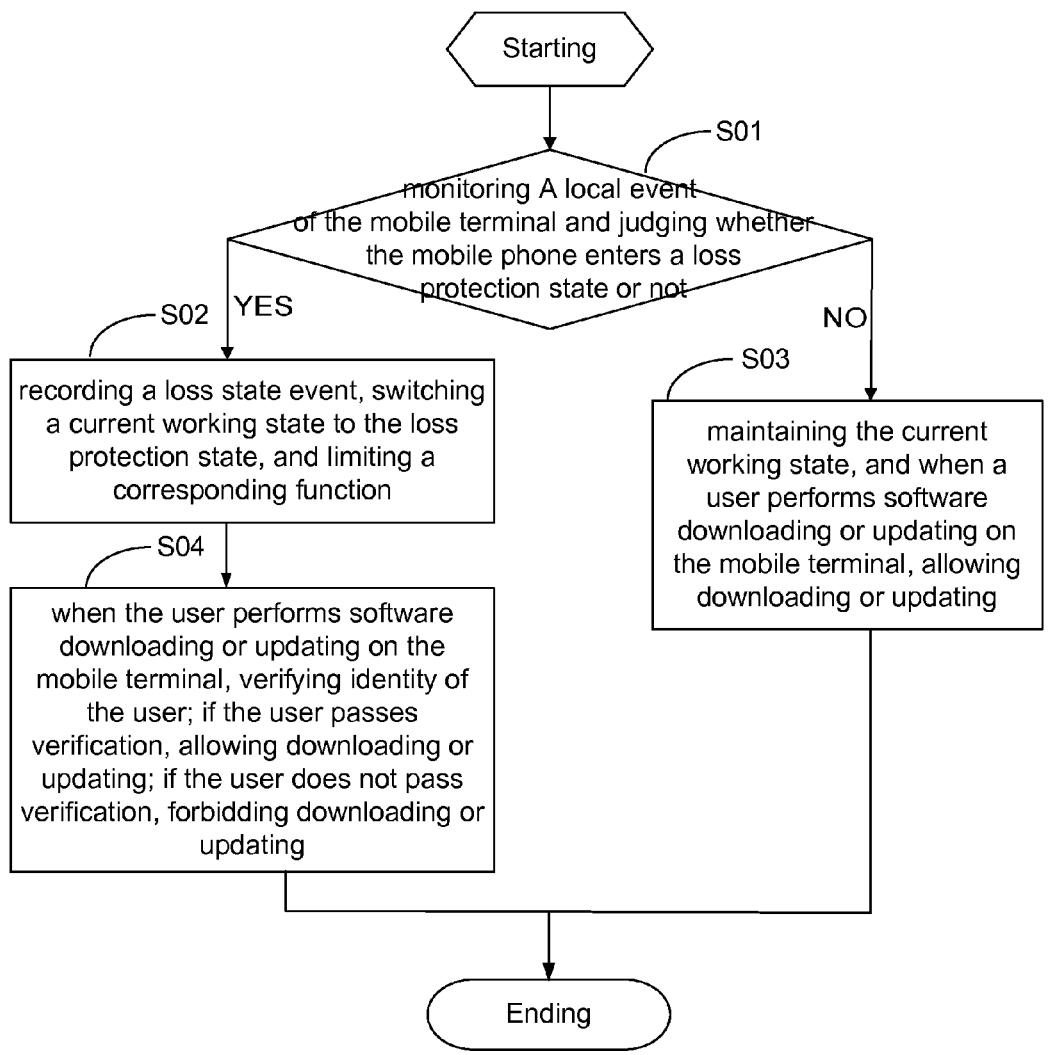
FIG. 2 is a flowchart of another embodiment of a version protection method for a mobile terminal according to the present disclosure.

As shown in FIG. 2, FIG. 2 is a flowchart of another embodiment of a version protection method for a mobile terminal according to the present disclosure. Compared with the embodiment shown in FIG. 1, the embodiment in FIG. 2 further includes Step S04; The embodiment here only specifically describes Step S04. After Step S02 of recording the loss state event, switching the current working state to the loss protection state, and limiting the corresponding function, the version protection method for the mobile terminal according to the embodiment of the present disclosure further includes the following step:

Step S04: when the user performs software downloading or updating on the mobile terminal, identity of the user is verified; if the user passes the verification, then the downloading or updating is allowed; if the user does not pass verification, then the downloading or updating is forbidden.

When the user performs software downloading or updating on the mobile terminal, and a current state of the mobile terminal is read to be the loss protection state, the user needs to input identity verification information into a version downloading tool so as to verify the identity of the user; if the user passes the verification, then the downloading or updating is allowed; if the user does not pass the verification, then the downloading or updating is forbidden.

In a preferred embodiment, after the user inputs the identity verification information, the mobile terminal reads a pre-stored loss protection identity verification key, i.e. an identity verification key, and compares the identity verification information input by the user with the stored identity verification key, and if the identity verification information is consistent with the stored identity verification key, then it is considered the user passes the verification, and downloading, updating and other legal operations are allowed; if the identity verification information is inconsistent with the stored identity verification key, then the user cannot pass the verification, and any downloading or updating operation is forbidden.

If the user performs software downloading or updating on the mobile terminal and the current state of the mobile terminal is read to be the normal working state, then the user is allowed to perform downloading, updating and any other legal operation.

The embodiment obtains a beneficial effect that a person holding the mobile terminal can be prevented from illegally recovering the mobile terminal entering the protection state, further enhancing the protection function of the mobile terminal, and greatly improving the reliability of the mobile terminal and the security of personal information stored in the mobile terminal by the user, by verifying the identity of the user when the user performs software downloading or updating on the mobile terminal, allowing downloading or updating when the user passes verification, otherwise forbidding downloading or updating when the user does not pass verification.

Figure 3:
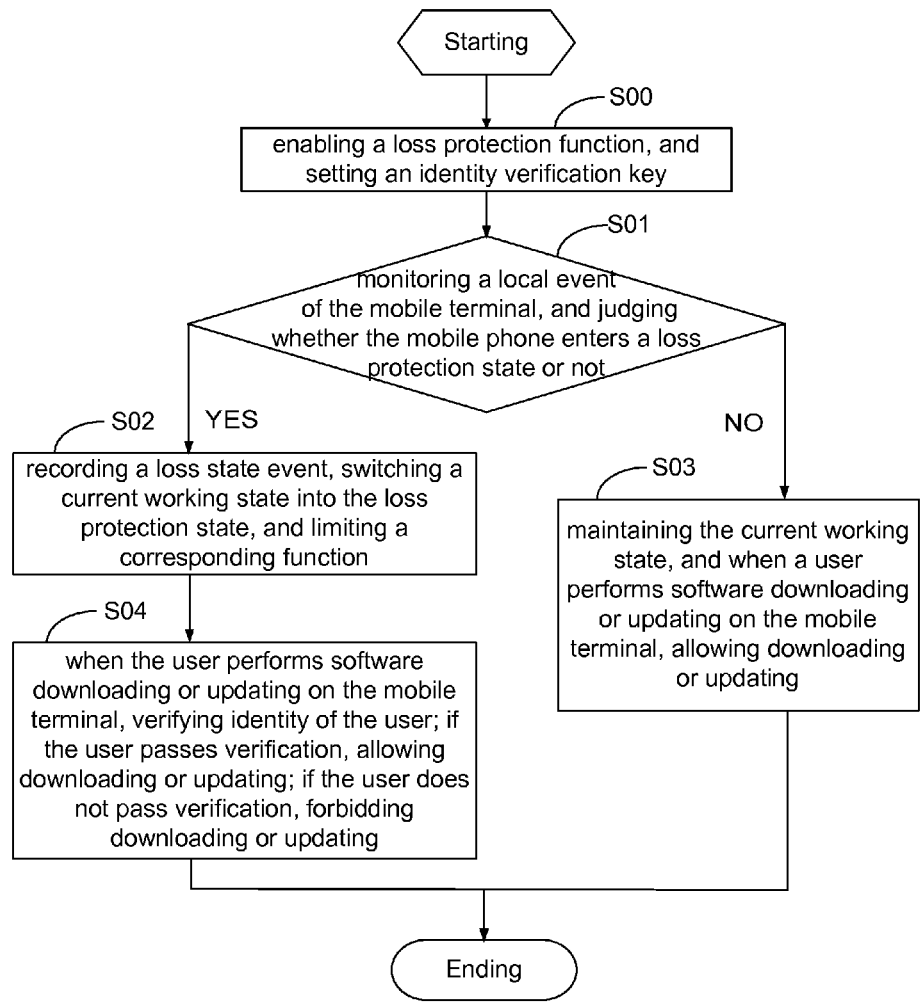
FIG. 3 is a flowchart of a still another embodiment of a version protection method for a mobile terminal according to the present disclosure.

As shown in FIG. 3, FIG. 3 is a flowchart of a still another embodiment of a version protection method for a mobile terminal according to the present disclosure; compared with the embodiment shown in FIG. 2, the embodiment further includes Step S00; the embodiment here only specifically describes Step S00, and the other steps involved in the version protection method for the mobile terminal according to the embodiment of the present disclosure may refer to specific descriptions in the related embodiments, and will not be repeated here.

As shown in FIG. 3, before Step S01 of monitoring the local event of the mobile terminal, and judging whether the mobile terminal enters the loss protection state or not, the version protection method for the mobile terminal according to the embodiment of the present disclosure may further include the following step:

Step S00: a loss protection function is enabled, and an identity verification key is set.

In order to avoid the mobile terminal from being illegally used by other users except an owner due to the loss of the mobile terminal or other reasons, the owner needs to enable the loss protection function of the mobile terminal through a loss protection function setting entry, and perform related configuration; and the mobile terminal enables own loss protection function according to the selection and configuration of the owner, and sets a user identity verification key.

The mobile terminal enables the loss protection function and sets the identity verification key, thereby avoiding important resources from being stolen, the mobile terminal from being illegally operated and the like after the mobile terminal is acquired by other users except the owner due to the loss or stealing of the mobile terminal or other reasons, and also preventing the person holding the mobile terminal from bypassing the loss protection function of the mobile terminal through corresponding operations (for example, recovery, software uninstalling or other operations performed to the mobile terminal), ensuring the reliability of the loss protection function of the lost mobile terminal, and providing complete protection for the lost mobile terminal.

Figure 4:
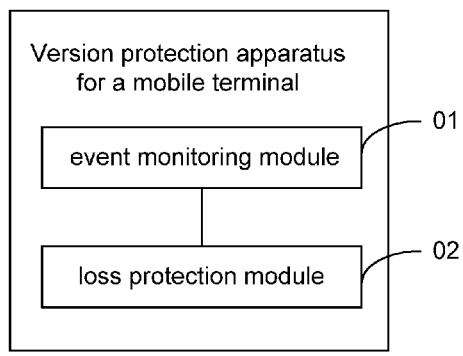
FIG. 4 is a structure diagram of an embodiment of a version protection apparatus for a mobile terminal according to the present disclosure.

FIG. 4 is a structure diagram of an embodiment of a version protection apparatus for a mobile terminal according to the present disclosure; and as shown in FIG. 4, the version protection apparatus for the mobile terminal according to the embodiment of the present disclosure includes an event monitoring module 01 and a loss protection module 02.

The event monitoring module 01 is configured to monitor a local event of the mobile terminal, and judge whether the mobile phone enters a loss protection state or not.

The event monitoring module 01 in the mobile terminal monitors the local event of the mobile terminal, and judges whether the mobile terminal needs to enter the loss protection state or not according to a specific monitoring condition.

Figure 5:
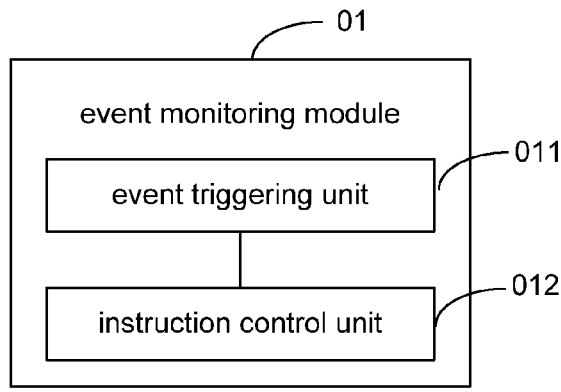
FIG. 5 is a structure diagram of an embodiment of an event monitoring module in a version protection apparatus for a mobile terminal according to the present disclosure.

FIG. 5 is a structure diagram of an embodiment of an event monitoring module in a version protection apparatus for a mobile terminal according to the present disclosure; and as shown in FIG. 5, in the version protection apparatus for the mobile terminal according to the embodiment of the present disclosure, the event monitoring module 01 includes an event triggering unit 011 and an instruction control unit 012, wherein the event triggering unit 011 is configured to, when the local event of the mobile terminal is monitored, control the mobile phone to enter the loss protection state under the triggering of the loss state event; and the instruction control unit 012 is configured to, when the local event of the mobile terminal is monitored, if a remote control instruction is received, then perform identity authentication on the remote control instruction, and then control the mobile phone to enter the loss protection state if the remote control instruction passes the identity authentication, otherwise, continue monitoring the remote control instruction if the remote control instruction does not pass the identity authentication.

In a preferred embodiment, judgment criterions for the event monitoring module 01 to judge whether the mobile terminal enters the loss protection state or not mainly include two conditions: one is that the event triggering unit 011 monitors a state of the mobile terminal according to a specific loss rule, and the event triggering unit 011 determines that the mobile terminal enters the loss protection state after the mobile terminal satisfies a defined locking rule or a loss triggering condition, for example, a SIM card is replaced unlawfully; the other is that the instruction control unit 012 monitors a remote control instruction, the instruction control unit 012 performs identity authentication on the remote control instruction after the remote control instruction is received, and whether the mobile terminal needs to enter the loss protection state or not is judged according to an identity authentication result, specifically, the instruction control unit 012 determines that the mobile terminal enters the loss protection state if the remote control instruction passes the identity authentication, otherwise the instruction control unit 012 continues monitoring the remote control instruction if the remote control instruction does not pass the identity authentication.

The loss protection module 02 is configured to, after the mobile phone is determined to enter the loss protection state, record a loss state event, switch a current working state to the loss protection state, and limit a corresponding function;

when the event monitoring module 01 determines that the mobile terminal enters the loss protection state, the loss protection module 02 records and stores the loss state event which triggers the mobile terminal to enter the loss protection state; and meanwhile, the loss protection module 02 switches the current working state to the loss protection state, forces a system to be restarted, and limits some functions and available resources of the mobile terminal according to certain protection rules in a forced restarting process of the system;

when the event monitoring module 01 determines that the mobile terminal does not enter the loss protection state and the mobile terminal is still in a normal working state, the mobile terminal is maintained in the current normal working state, and the user is allowed to perform all legal operations, for example, software downloading or program updating is allowed.

The embodiment obtains a beneficial effect that specific version protection can be provided for the mobile terminal entering the protection state, improves the reliability of the mobile terminal, and enhances the user experience, by monitoring the local event of the mobile terminal, recording the loss state event after the mobile terminal is determined to enter the loss protection state, switching the current working state to the loss protection state and limiting the corresponding function.

Figure 6:
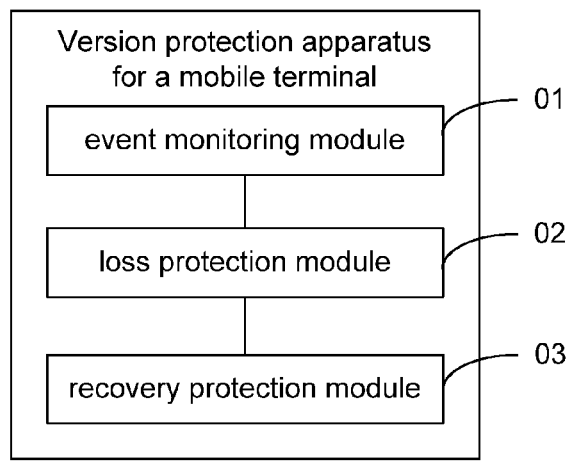
FIG. 6 is a structure diagram of another embodiment of a version protection apparatus for a mobile terminal according to the present disclosure.

As shown in FIG. 6, FIG. 6 is a structure diagram of another embodiment of a version protection apparatus for a mobile terminal according to the present disclosure; compared with the embodiment shown in FIG. 4, the embodiment further includes a recovery protection module 03. The embodiment here only specifically describes the function of the recovery protection module 03, and functions of other modules involved in the version protection apparatus for the mobile terminal according to the embodiment of the present disclosure may refer to specific descriptions in the related embodiments, and will not be repeated here.

As shown in FIG. 6, the version protection apparatus for the mobile terminal according to the embodiment of the present disclosure further includes the recovery protection module 03 configured to, when the mobile terminal enters the loss protection state and a user performs software downloading or updating on the mobile terminal, verify identity of the user, allow downloading or updating if the user passes the verification, otherwise forbid the software downloading or updating if the user does not pass the verification.

When the user performs software downloading or updating on the mobile terminal, and the event monitoring module 01 reads that a current state of the mobile terminal is the loss protection state, the recovery protection module 03 requires the user to input identity verification information into a version downloading tool so as to verify the identity of the user; if the user passes the verification, the recovery protection module 03 allows the downloading or updating; otherwise if the user does not pass the verification, the recovery protection module 03 forbids the downloading or updating.

In a preferred embodiment, after the user inputs the identity verification information, the recovery protection module 03 reads a pre-stored loss protection identity verification key, i.e. an identity verification key, and compares the identity verification information input by the user with the stored identity verification key, and if the identity verification information is consistent with the stored identity verification key, then it is considered the user passes then verification, and the recovery protection module 03 allows legal operation such as downloading, updating and the like; if the identity verification information is inconsistent with the stored identity verification key, then the user cannot pass the verification, and the recovery protection module 03 forbids any downloading or updating operation.

The embodiment obtains a beneficial effect that a person holding the mobile terminal can be prevented from illegally recovering the mobile terminal entering the protection state, further enhancing the protection function of the mobile terminal, and greatly improving the reliability of the mobile terminal and the security of personal information stored by the user in the mobile terminal by means of verifying the identity of the user when the user performs software downloading or updating on the mobile terminal, allowing downloading or updating when the user passes verification, and forbidding downloading or updating when the user does not pass verification.

Figure 7:
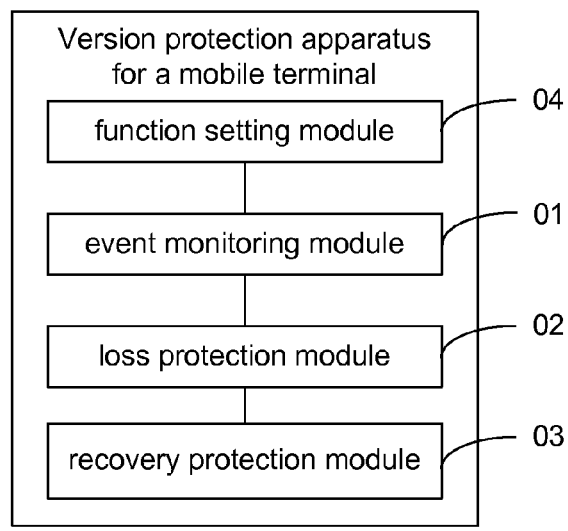
FIG. 7 is a structure diagram of a still another embodiment of a version protection apparatus for a mobile terminal according to the present disclosure.

As shown in FIG. 7, FIG. 7 is a structure diagram of a still another embodiment of a version protection apparatus for the mobile terminal according to the present disclosure; compared with the embodiment shown in FIG. 6, the embodiment further includes a function setting module 04; the embodiment only specifically describes the function of the function setting module 04, and functions of other modules involved in the version protection apparatus for the mobile terminal according to the embodiment of the present disclosure may refer to specific descriptions in the above-mentioned embodiments, and will not be repeated here.

As shown in FIG. 7, the version protection apparatus for the mobile terminal according to the embodiment of the present disclosure may further include the function setting module 04 configured to enable a loss protection function and set an identity verification key.

In order to avoid the mobile terminal from being illegally used by other users except an owner due to the loss of the mobile terminal or other reasons, the owner needs to enable the loss protection function of the mobile terminal through a loss protection function setting entry, and perform related configuration; the function setting module 04 enables the loss protection function of the mobile terminal according to the selection and configuration of the owner, and sets a corresponding user identity verification key.

The mobile terminal enables the loss protection function and sets the identity verification key, so that the problem that an important resource is stolen, the mobile terminal is illegally operated and the like after the mobile terminal is acquired by the other users except the owner due to the loss and stealing of the mobile terminal or the other reasons is solved, and the problem that the person holding the mobile terminal bypasses the loss protection function of the mobile terminal by corresponding operation (for example, recovery, software uninstalling and other operations performed to the mobile terminal) is also solved, the reliability of the loss protection function of the lost mobile terminal is ensured, and the lost mobile terminal can be completely protected.

The above are only the preferred embodiments of the present disclosure but not thus intended to limit the scope of the present disclosure. The direct or indirect application of equivalent structure or equivalent flow transformations made by virtue of contents of the Specification and the drawings of the present disclosure to other related technical fields shall be similarly included in the scope of protection of the present disclosure.

What is claimed is:

1. A method for protecting a version of a software in a mobile terminal, the version of the software having a loss protection function, the method comprising:
    monitoring a local event of the mobile terminal, and judging whether the mobile terminal enters a loss protection state or not;
    after the mobile terminal is determined to enter the loss protection state, recording a loss state event, switching a current working state to the loss protection state, and limiting a corresponding function; and
    when a user performs software updating on the mobile terminal and thereby changes the version of the software and removes the loss protection function from the mobile terminal, verifying identity of the user; if the user passes verification, then allowing the software updating, the changing of the version of the software and the removing of the loss protection function; if the user does not pass verification, forbidding the software updating, the changing of the version of the software and the removing of the loss protection function,
    wherein the step of monitoring the local event of the mobile terminal, and judging whether the mobile terminal enters the loss protection state or not comprises:
    when the local event of the mobile terminal is monitored, controlling the mobile terminal to enter the loss protection state if there is triggering of the loss state event; if a remote control instruction is received, then performing identity authentication on the remote control instruction; if the remote control instruction passes the identity authentication, then controlling the mobile terminal to enter the loss protection state; if the remote control instruction does not pass the identity authentication, then continuing monitoring the remote control instruction.

2. The method according to claim 1, before monitoring the local event of the mobile terminal, and judging whether the mobile terminal enters the loss protection state or not, the method further comprising:
    enabling a loss protection function, and setting an identity verification key.

3. The method according to claim 2, wherein the step of verifying the identity of the user comprises:
    comparing identity verification information input by the user with a stored identity verification key;
    if the identity verification information input by the user is consistent with the stored identity verification key, then determining that the user passes the verification;
    if the identity verification information input by the user is inconsistent with the stored identity verification key, then determining that the user does not pass the verification.

4. The method according to claim 1, wherein the step of verifying the identity of the user comprises:
    comparing identity verification information input by the user with a stored identity verification key;
    if the identity verification information input by the user is consistent with the stored identity verification key, then determining that the user passes the verification;
    if the identity verification information input by the user is inconsistent with the stored identity verification key, then determining that the user does not pass the verification.

5. An apparatus for protecting a version of a software in a mobile terminal, the version of the software having a loss protection function, the apparatus comprising:
    a memory having stored therein executable instructions; and
    a processor configured to be capable of executing the stored executable instructions to perform steps of:
    monitoring a local event of the mobile terminal, and judging whether the mobile terminal enters a loss protection state or not;
    after the mobile terminal is determined to enter the loss protection state, recording a loss state event, switching a current working state to the loss protection state, and limiting a corresponding function; and
    when the mobile terminal enters the loss protection state and a user performs software updating on the mobile terminal and thereby changes the version of the software and removes the loss protection function from the mobile terminal, verifying identity of the user, and then allowing the software updating, the changing of the version of the software and the removing of the loss protection function if the user passes verification, otherwise forbidding the software updating, the changing of the version of the software and the removing of the loss protection function if the user does not pass verification,
    wherein the step of monitoring the local event of the mobile terminal, and judging whether the mobile terminal enters the loss protection state or not comprises at least one of:
    when the local event of the mobile terminal is monitored, controlling the mobile terminal to enter the loss protection state if there is triggering of the loss state event; and
    when the local event of the mobile terminal is monitored, if a remote control instruction is received, then performing identity authentication on the remote control instruction, and controlling the mobile terminal to enter the loss protection state if the remote control instruction passes the identity authentication, otherwise continuing monitoring the remote control instruction if the remote control instruction does not pass the identity authentication.

6. The apparatus according to claim 5, wherein the processor is further configured to be capable of executing the stored executable instructions to perform a step of:
    enabling a loss protection function, and setting an identity verification key.

7. The apparatus according to claim 6, wherein the step of verifying the identity of the user comprises:
    comparing identity verification information input by the user with a stored identity verification key, then determining that the user passes the verification if the identity verification information input by the user is consistent with the stored identity verification key, otherwise, determining that the user does not pass the verification if the identity verification information input by the user is inconsistent with the stored identity verification key.

8. The apparatus according to claim 5, wherein the step of verifying the identity of the user comprises:

comparing identity verification information input by the user with a stored identity verification key, then determining that the user passes the verification if the identity verification information input by the user is consistent with the stored identity verification key, otherwise, determining that the user does not pass the verification if the identity verification information input by the user is inconsistent with the stored identity verification key.

* * * * *